United States Patent
Klein et al.

(10) Patent No.: US 7,127,972 B2
(45) Date of Patent: Oct. 31, 2006

(54) METHOD AND APPARATUS FOR ATTACHING A ROD MEMBER TO A REMOTE SURFACE

(76) Inventors: David T. Klein, 11819 S. Lawler Ave., Alsip, IL (US) 60803; Donald M. Klein, 114 Nippersink Dr., McHenry, IL (US) 60050

( * ) Notice: Subject to any disclaimer, the term of this patent is extended or adjusted under 35 U.S.C. 154(b) by 329 days.

(21) Appl. No.: 10/382,285

(22) Filed: Mar. 5, 2003

(65) Prior Publication Data

US 2004/0173059 A1    Sep. 9, 2004

(51) Int. Cl.
  *B25G 1/00*    (2006.01)
(52) U.S. Cl. ........................ 81/177.2; 81/53.1
(58) Field of Classification Search .............. 81/177.2, 81/121.1, 180.1, 52, 53.1, 462, 436–461, 81/901; 279/43, 46.3, 48, 52, 83, 43.2
See application file for complete search history.

(56) References Cited

U.S. PATENT DOCUMENTS

| | | | |
|---|---|---|---|
| 4,076,444 A | | 2/1978 | Siebrecht |
| 4,218,794 A | | 8/1980 | Seidel et al. |
| 4,350,064 A | * | 9/1982 | Markle ........................ 81/437 |
| 4,551,875 A | * | 11/1985 | Getz et al. ..................... 7/138 |
| 4,573,839 A | * | 3/1986 | Finnegan ................ 408/239 R |
| 4,676,703 A | * | 6/1987 | Swanson ................ 408/239 R |
| 4,766,783 A | | 8/1988 | Stanich et al. |
| 4,791,690 A | * | 12/1988 | Kuang-Wu ..................... 7/138 |
| 4,934,717 A | * | 6/1990 | Budelman et al. ............ 279/79 |
| 4,970,921 A | * | 11/1990 | Fagan ........................ 81/121.1 |
| 4,982,625 A | | 1/1991 | Bonner |
| 5,154,104 A | * | 10/1992 | O ............................... 81/177.2 |
| 5,327,801 A | * | 7/1994 | Andreasen et al. ........... 81/125 |
| 5,400,681 A | * | 3/1995 | Strauch ..................... 81/177.2 |
| 5,409,333 A | | 4/1995 | Hu |
| 5,564,717 A | * | 10/1996 | Alberts ....................... 279/145 |
| 5,943,925 A | * | 8/1999 | Huang ....................... 81/177.2 |
| 5,979,913 A | | 11/1999 | Kosik et al. |
| 6,095,016 A | * | 8/2000 | Lam ........................... 81/121.1 |
| 6,223,375 B1 | | 5/2001 | Vaughan, Jr. |
| 6,282,998 B1 | * | 9/2001 | Beach .......................... 81/437 |
| 6,293,172 B1 | * | 9/2001 | Smith ........................ 81/57.13 |
| 6,601,478 B1 | * | 8/2003 | Hanson ..................... 81/177.2 |
| 2002/0088313 A1 | * | 7/2002 | Dockery .................... 81/121.1 |

FOREIGN PATENT DOCUMENTS

EP    596669 A1  *  5/1994

* cited by examiner

*Primary Examiner*—David B. Thomas
(74) *Attorney, Agent, or Firm*—Gardner, Carton & Douglas LLP

(57) ABSTRACT

An apparatus for facilitating the placement of a rod member into a remote surface, comprising: an elongated hollow tube member having a first end and a second end; the first end of the elongated hollow tube member adapted to receive and removably secure a drill bit with the drill bit projecting from the end of the tube member; the first end of the elongated hollow tube member further adapted to receive and removably secure an anchor with the rod member projecting therefrom, the rod member being of a length less than the elongated tube member and having a greatest outer diameter less than the inner diameter of the elongated tube member; and the second end of the elongated hollow tube member adapted to be mounted in a driving apparatus.

19 Claims, 3 Drawing Sheets

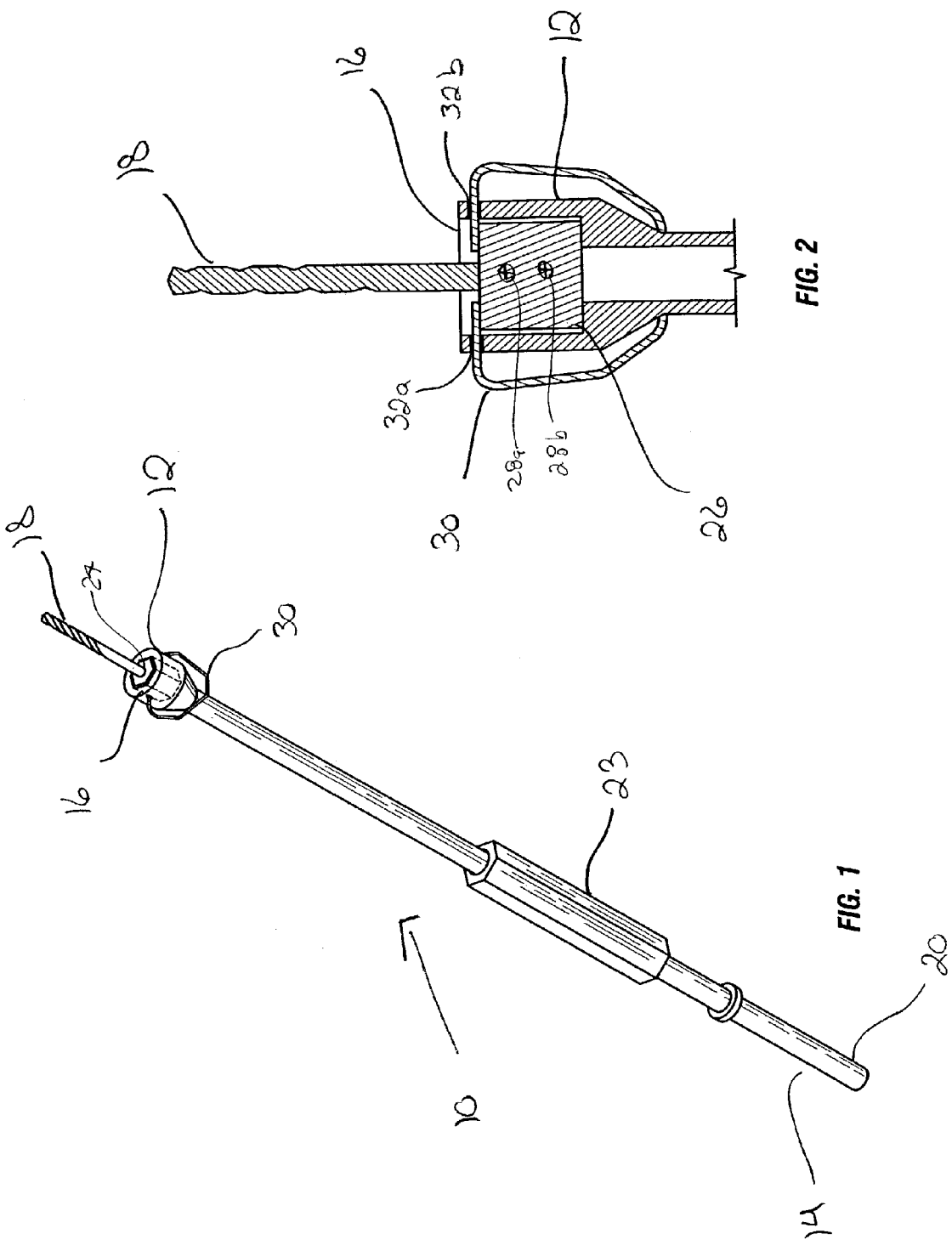

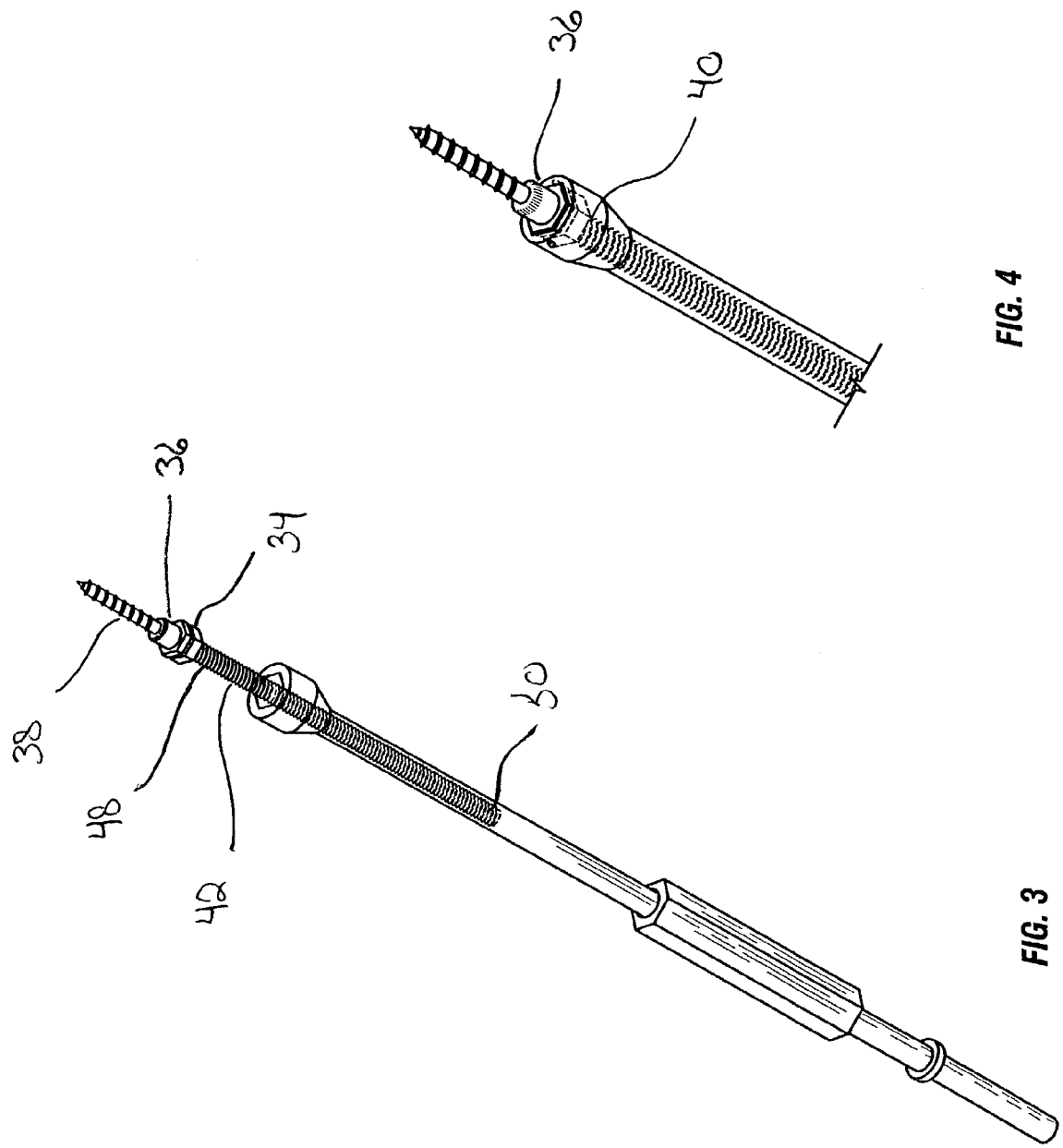

METHOD AND APPARATUS FOR ATTACHING A ROD MEMBER TO A REMOTE SURFACE

FIELD OF THE INVENTION

The present invention relates generally to an accessory for use with a hand tool such as a power drill or screwdriver, and particularly to a device for extending the distance between the hand tool and a bit for driving anchors and attached rod members into a receiving medium.

BACKGROUND OF THE INVENTION

It has become more and more popular to install drop ceilings to cover mechanical trades in ceiling areas in commercial buildings and the like. In the typical installation process, a series of rods are secured to a commercial ceiling at predetermined sites. The rods are precut to a desired length to allow for the installation of tracks or hangars for suspending the ceiling tiles in place a uniform distance from the remote overhead surface. Quite often the distance from the ground to the remote surface ranges anywhere from 9 to 16 feet, even greater in commercial applications. This distance can make the installation process extremely burdensome.

In a typical installation process, the installer climbs up on a ladder and pre-drills a hole for an anchor, such as a Sammy Super Screw™ anchor. This usually involves maneuvering a power drill around a number of mechanical trades, such as duct work, steam pipes, plumbing, electrical conduits, etc., and pre-drilling a hole. Next, the installer climbs down the ladder and mounts the anchor into the drill. He then climbs back up the ladder and again manipulates the power drill in the spaces between the plumbing, duct work, etc. so that the anchor tip is lined up with the pre-drilled hole, and operates the drill to screw the anchor into the ceiling. Then, the installer steers the power drill back out through the spaces between the duct work and plumbing, gets down off of the ladder, picks up a threaded rod cut to the appropriate length, climbs back up on the ladder, and maneuvers the rod around the mechanical trades until the rod is placed within the head of the anchor. The installer then proceeds to repeat the entire process for the next rod. This continuous need to maneuver around the mechanical trades, coupled with the need to climb up and down a ladder several times, consumes a large amount of time, money and energy.

SUMMARY OF THE INVENTION

To overcome the burden previously associated with the installation of drop ceilings in commercial applications, the disclosed invention provides for a method and apparatus for facilitating the mounting of an anchor with a rod pre-attached to the head of the anchor. As more fully described below, the invention includes a pole extension for quick installation of a rod and attached anchor. The pole extension is quicker and easier to use because it replaces the need to climb long ladders all the way to the building ceiling to install the anchors and rods. If necessary, the pole extension can be used in conjunction with an 8-foot ladder to achieve the desired results. The elimination of the use of ladders or the use of a smaller ladder decreases the chances for a fall, which is a major issue in this industry.

The extension can be used to both drill the hole and also securely place the anchor, with pre-attached rod, into the drilled hole. The extension obviates the need to bring the power drill all the way to the ceiling, and maneuver the drill around ducts, pipes, etc. to get to the proper drill location. This saves a large quantity of labor hours.

BRIEF DESCRIPTION OF THE DRAWINGS

FIG. 1 is a side elevation view of a bushing-mounted drill bit being secured to the socket end of a hollow extending tube;

FIG. 2 is a section view of the bushing-mounted drill bit of FIG. 1 secured to the socket end of the elongated hollow tube member by a spring clip;

FIG. 3 is a side elevation view of an anchor with attached rod being slidably connected to the socket end of a hollow extending;

FIG. 4 is a section view of the anchor and attached rod arrangement of FIG. 3 removably secured to the socket end of the hollow extending tube.

DETAILED DESCRIPTION OF THE PREFERRED EMBODIMENT

Figure 5:
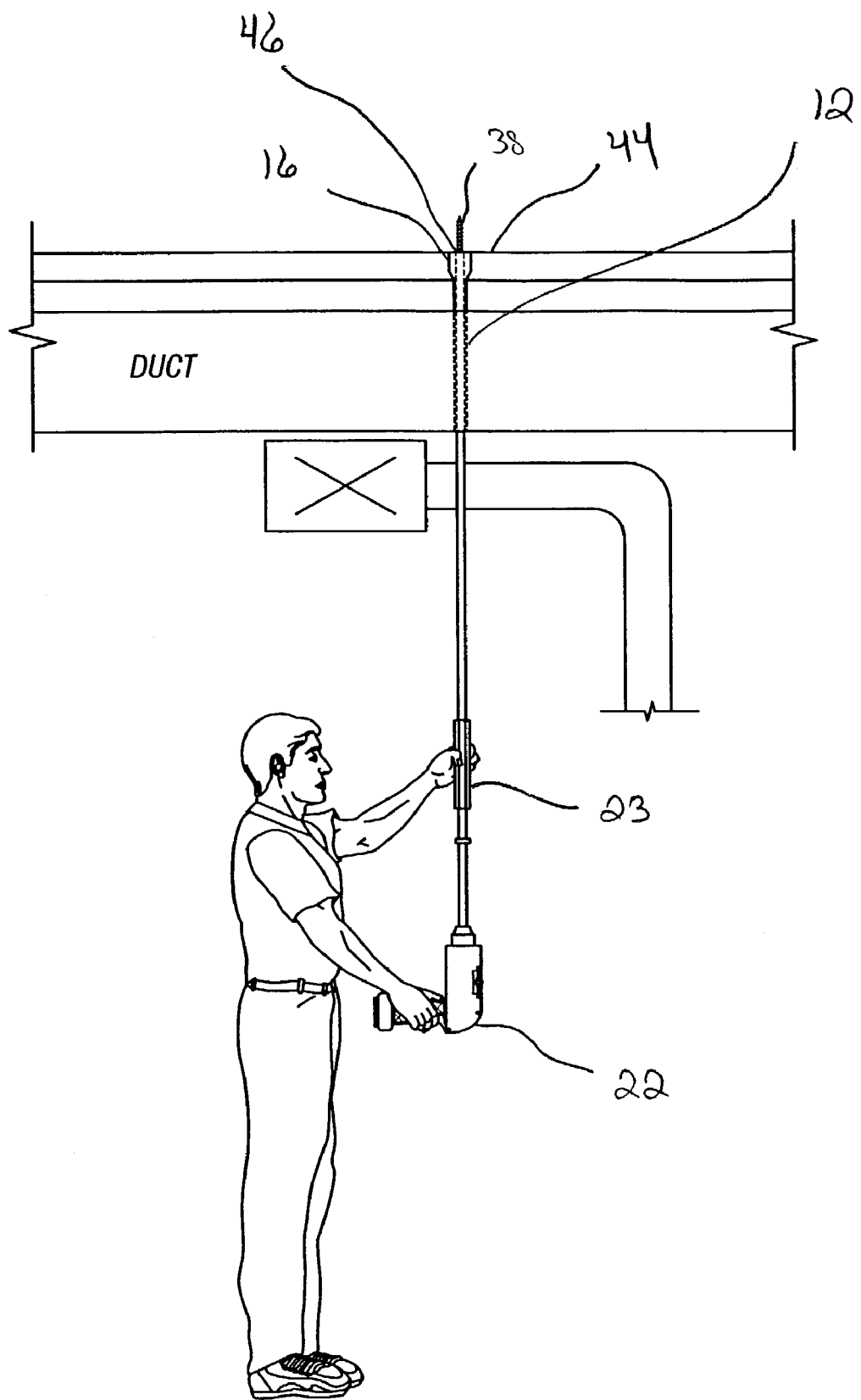
FIG. 5 is a perspective view of an operator driving the anchor and attached rod from FIGS. 3 and 4 into the ceiling, with the user grasping with one hand the drill apparatus attached to the second end of the disclosed invention and using the other hand to grasp the grip member, thereby maintaining control of the elongated tube member during the driving step.

The disclosed invention is a method and apparatus for facilitating the installation of drop ceilings. Specifically, the disclosed invention is directed towards a method and apparatus for facilitating the mounting of a ceiling anchor with a pre-attached rod into a remote surface.

As seen in FIGS. 1 and 2, the invention includes an elongated hollow tube member 10 with a first end 12 and a second end 14. Preferably, the elongated hollow tube member 10 is formed of 4130 grade mil-T6736 wall steel tubing, with a 0.500 inch outer diameter. The suggested length of the tube member 10 as shown is six feet, although the tube member 10 can be made longer or shorter to suit a particular need. Although the tube member 10 is preferably formed as a tube with a relatively smooth surface, it can be multi-sided and include a plurality of edges along its exterior.

The first end 12 includes a socket portion 16 adapted to receive a drill bit 18. The second end 14 of the elongated hollow tube member 10 includes an adapter 20 for mounting the second end 14 of the hollow tube member 10 into a driving apparatus 22, such as a screwdriver or power drill. The adapter 20 shown in FIGS. 1 and 2 is an SDS style adapter for a hammer drill, approximately 2.125 inches in length. Adjacent the adapter 20 along the tube member 10 is a hex-type grip member 23, preferably made of nylon. The grip member 23, the function of which will be discussed in more detail below, is adapted to slip fit over the outer diameter of the tube member 10, and is slidably disposable along the length of the tube member 10.

As further illustrated in FIGS. 1 and 2, the drill bit 18 is preferably bushing-mounted, although other mounting means can be utilized as long as the shape of the means is comparable to the shape of the socket portion 16. In the preferred embodiment, the drill bit 18 is fit into a hole 24 in a hex-type bushing 26 and locked into place using set screws 28*a* and 28*b*. The hex-type bushing 26 is removably retained in the socket 16 by a spring mechanism 30. As shown in FIGS. 1 and 2, the spring mechanism 30 is a removable clip, the sides of which fit within apertures 32a and 32b of socket portion 16.

As illustrated in FIGS. 3 and 4, the socket portion 16 of the elongated tube member 10 is further adapted to also receive the hex-type head 34 of an anchor 36. In the embodiment shown in FIG. 4, the anchor 36 is a SAMMY SUPER SCREW™ anchor, manufactured by Phoenix Fastener Company, Inc. of Chicago, Ill. However, it is known that other types of anchors of various sizes and shapes can also be used, as long as the head 34 of the anchors 36 and the socket portion 16 are adapted to mate with each other. In the embodiment shown in FIGS. 3 and 4, the SAMMY SUPER SCREW™ anchor 36 includes threads 38 at one end and a head 34 at the other. The head 34 is hex-shaped to fit within the hex-shaped socket 16 of the elongated hollow tube member 10. The head 34 also includes an aperture 40 for receiving a rod member 42. Preferably the aperture 40 is internally threaded to allow for the rod member 42 to be screwed into the head 34 of the SAMMY SUPER SCREW™ anchor 36. Alternatively, rod member 42 need not be threaded and aperture 40 can be adapted to receive the rod member 42 in other ways, such as tapping the rod member 42 into the aperture 40 or permanently welding or gluing the rod member 42 to the head of the anchor 16.

The elongated hollow tube member 10 and the rod member 42 need not be round, but also may be square, triangular, flat, "L" shaped, etc. The terms tube and rod are used here to refer to all such tube and rod shapes. Further the term diameter is not meant to limit the shape to a round shape, and is used as a measurement of the greatest lateral dimension (i.e., the greatest length of a straight line through the center of an object from side to side, taken at a right angle to the longer axis.) For example, where the shape is a circle the lateral dimension would be its diameter. Where the shape is a square, the lateral dimension would be its diagonal.

In all cases, the inner diameter of the elongated tube member 10 will be greater than the outer diameter or greatest outer diameter of the rod member 42.

In operation, the worker slides the bushing-mounted drill bit 18 into the socket portion 16 of the elongated hollow tube member 10 and maneuvers the tube member 10 into place so that the drill bit 18 is opposite the appropriate place in a remote surface 44, typically a ceiling. To control the tube member 10, the worker has the option of grasping the grip member 23 with one hand, and holding the driving apparatus 22 with the other. The worker then proceeds to drive the drill bit 18 into the remote surface 44. After drilling a hole 46 at the pre-selected position, the tube member 10 and attached drill bit 18 is withdrawn from the remote surface 44. The spring mechanism 30 prevents the drill bit 18 from separating from the tube member 10.

Next, the worker precuts a rod member 42 to the desired length. One end 48 of the rod member is threadably secured into the head 34 of the SAMMY SUPER SCREW™ anchor 36. The other end 50 of the rod member 42 is passed through the socket portion 16 and into the elongated hollow tube member 10 until the head 34 of the SAMMY SUPER SCREW™ anchor 36 sits within the socket 16. In order for the rod member 42 to fit wholly within the elongated hollow tube member 10, the length of the rod member 42 must be less than or equal to the length of the tube member 10. Further, the outer diameter of the rod member 42 must be less than the inner diameter of the tube member 10. In the preferred embodiment, the tube member 10 has an inner diameter great enough to allow for the containment of industry standard 0.125 and 0.375 inch diameter rod members 42.

As best seen in FIG. 5, the worker then maneuvers the tube member 10 until the threaded end 38 of the SAMMY SUPER SCREW™ anchor 36 is in the desired location opposite the previously drilled hole 46. The worker then drives the threaded end 38 of the SAMMY SUPER SCREW™ anchor 36 into the drilled hole 46 via the power drill apparatus 18 attached to the second end 14 of the tube member 10.

After the SAMMY SUPER SCREW™ anchor 36 is secured into the remote surface 44, the tube member 10 is withdrawn, allowing the SAMMY SUPER SCREW™ anchor 36 and attached rod member 42 to slide out the socket portion end 16 of the tube member 10. The worker then proceeds to the next appropriate site for attaching another rod member 42.

It is known to one of skill in the art that the use of a drill bit 18 would be unnecessary in cases where the anchor 36 could be secured to the remote surface 44 absent the need for a pre-drilled hole 46. Further, it is known that the worker could choose to pre-drill all the holes 46 prior to installing the anchors 36 and attached rod members 42.

While a preferred embodiment of the invention has herein been illustrated and described, this has been done by way of illustration and not limitation, and the invention should not to be limited except as required by the scope of the appended claims.

What is claimed is:

1. An apparatus for attaching an elongated rod member to a remote surface, comprising:
   an elongated hollow tube member having a first end and a second end;
   the first end of the elongated hollow tube member adapted to receive and removably secure a drill bit with the drill bit projecting from the end of the tube member;
   the first end of the elongated hollow tube member further adapted to receive and removably secure the head of an anchor with the rod member projecting therefrom into the hollow tube member, the rod member being of a length less than the length of the elongated hollow tube member and having an outer diameter less than the inner diameter of the hollow tube member; and
   the second end of the elongated hollow tube member adapted to be mounted in a driving apparatus.

2. The apparatus provided for in claim 1 wherein the drill bit is bushing-mounted and the bushing is adapted to securely fit within the first end of the elongated hollow tube member.

3. The apparatus provided for in claim 2 further including a socket at the first end of the elongated hollow tube member, the socket being adapted to mate with the bushing-mounted drill bit.

4. The apparatus provided for in claim 1 further including a socket at the first end of the elongated hollow tube member, the socket being adapted to mate with the head of the anchor.

5. The apparatus provided for in claim 1 further including a grip member rotatably disposed over the outer diameter of the elongated hollow tube member.

6. The apparatus provided for in claim 5 wherein the grip member is slidably disposed over a portion of the elongated tube member.

7. The apparatus provided for in claim 1 wherein the shape of the elongated hollow tube member is selected from the group consisting of round, square, triangular, flat, or "L" shaped.

8. A kit for attaching an elongated rod member to a remote surface comprising;
   an elongated hollow tube member having a first end and a second end;
   the first end of the elongated hollow tube member adapted to receive and removably secure a drill bit with the drill bit projecting from the first end of the tube member;
   an anchor having a threaded end and a head at the other end;
   a rod member having a length less than the elongated tube member and an outer diameter less than the inner diameter of the elongated tube member;
   the rod member being attached to the head of the anchor;
   the first end of the elongated hollow tube member being adapted to receive and removably secure the head of the anchor with the threaded end of the anchor projecting from the first end of the tube member; and
   the second end of the elongated hollow tube member being adapted to receive a drill apparatus.

9. The kit provided for in claim 8 wherein the drill bit is bushing-mounted and adapted to securely fit within the first end of the elongated hollow tube member.

10. The kit provided for in claim 9 further including a socket at the first end of the elongated hollow tube member, the socket being adapted to mate with the bushing-mounted drill bit.

11. The kit provided for in claim 8 wherein at least one portion of the rod member is threaded.

12. The kit provided for in claim 8 further including a socket at the first end of the elongated hollow tube member, the socket being adapted to mate with the head of the anchor.

13. The kit provided for in claim 8 wherein the head of the anchor further includes an aperture for receiving the rod member.

14. The kit provided for in claim 8 wherein the anchor and the rod member are fixedly attached.

15. The kit provided for in claim 8 further including a grip member rotatably disposed over the outer diameter of the elongated hollow tube member.

16. The kit provided for in claim 15 wherein the grip member is slidably disposed over a portion of the elongated tube member.

17. The kit provided for in claim 8 wherein the shape of the rod member is selected from the group consisting of round, square, triangular, flat, or "L" shaped.

18. A method for securing a rod member into a remote surface comprising the following steps:
   providing an elongated hollow tube member with means for receiving and removably securing a drill bit at one end and means for mounting in a drill apparatus at the other;
   placing a bushing-mounted drill bit into the means for receiving a drill bit;
   positioning the elongated hollow tube member with the drill bit opposite a predetermined place in a remote surface;
   operating the drill apparatus to drive the drill bit into the remote surface thereby creating an aperture for receiving an anchor having a threaded end and a head at the other end;
   removing the busing-mounted drill bit from the means for receiving a drill bit;
   providing a rod member with a greatest outer diameter less than the inner diameter of the elongated hollow tube member;
   cutting the rod member to a desired length less than the length of the elongated tube member;
   affixing one end of the rod member to the head of the anchor;
   passing the other end of the rod member through the socket end of the elongated hollow tube member and sliding the threaded rod member into the hollow tube member until the head of the anchor is placed within the socket;
   maneuvering the elongated hollow tube member so that the threaded end of the anchor is opposite the aperture in the ceiling;
   operating the drill apparatus to drive the threaded end of the anchor into the remote surface; and
   removing the elongated hollow tube member, thereby exposing the rod member affixed to the anchor.

19. The method provided for in claim 18 further including the step of providing a grip member along a portion of the elongated hollow tube member and grasping the grip member to maintain control of the elongated hollow tube member.

* * * * *